(12) United States Patent  
Sacre et al.

(10) Patent No.: US 9,247,233 B2
(45) Date of Patent: Jan. 26, 2016

(54) ANAGYLPHIC STEREOSCOPIC IMAGE CAPTURE DEVICE

(71) Applicant: Thomson Licensing, Issy de Moulineaux (FR)

(72) Inventors: Jean-Jacques Sacre, Chateaugiron (FR); Valter Drazic, Betton (FR)

(73) Assignee: Thomson Licensing, Issy-les-Moulineaux (FR)

( * ) Notice: Subject to any disclaimer, the term of this patent is extended or adjusted under 35 U.S.C. 154(b) by 510 days.

(21) Appl. No.: 13/714,476

(22) Filed: Dec. 14, 2012

(65) Prior Publication Data

US 2013/0155194 A1  Jun. 20, 2013

(30) Foreign Application Priority Data

Dec. 15, 2011 (EP) .................................... 11306677

(51) Int. Cl.
*G02B 27/22* (2006.01)
*H04N 13/02* (2006.01)
*H04N 13/04* (2006.01)

(52) U.S. Cl.
CPC ....... *H04N 13/0203* (2013.01); *H04N 13/0214* (2013.01); *H04N 13/0422* (2013.01)

(58) Field of Classification Search
CPC .......... H04N 13/0431; H04N 13/0422; H04N 13/0239; G03B 35/00

USPC .............. 359/462, 464; 348/60; 396/324, 327
See application file for complete search history.

(56) References Cited

U.S. PATENT DOCUMENTS

| | | | |
|---|---|---|---|
| 3,712,199 A | 1/1973 | Songer | |
| 6,275,335 B1 | 8/2001 | Costales | |
| 2002/0131170 A1* | 9/2002 | Costales | ....................... 359/464 |

FOREIGN PATENT DOCUMENTS

| | | |
|---|---|---|
| JP | 2011254331 | 12/2011 |
| WO | WO0111894 | 2/2001 |
| WO | WO2011151948 | 12/2011 |

OTHER PUBLICATIONS

Robin Lobel Magenta-Cyan Anaglyphs Jan. 1, 2009, pp. 1-2.
European Search Report dated May 21, 2012.

* cited by examiner

*Primary Examiner* — Audrey Y Chang
(74) *Attorney, Agent, or Firm* — Myers Wolin LLC (57) ABSTRACT

The device comprises an aperture stop disc divided into a plurality of mutually exclusive filtering segments comprising a first, a second and a third filtering segment ; the third filtering segment is adapted to pass a third portion of the spectrum which is included in the portion of the spectrum passing the first and second filtering segments. Due to third filtering segment, the aperture assigned to the color component corresponding to the third portion of the spectrum—preferably blue—is larger than the aperture assigned to the color component corresponding to the portion of the spectrum passing the first and second filtering segments.

18 Claims, 3 Drawing Sheets

Fig.3 ium are divided at the aperture stop

ANAGYLPHIC STEREOSCOPIC IMAGE CAPTURE DEVICE

This application claims the benefit, under 35 U.S.C. §119 of EP Patent Application 11306677.3, filed 15 Dec 2011.

TECHNICAL FIELD

This invention relates to full color stereoscopic three-dimensional image capture device and to methods for their production. More particularly, the invention relates to a monolens anaglyphic three-dimensional image capture device which produces a three-dimensional picture capable of being alternatively viewed with appropriate colored glasses for full color three-dimensional effect or viewed without glasses as a two-dimensional picture.

BACKGROUND ART

The document U.S. Pat. No. 3,712,199 discloses an anaglyphic stereoscopic image capture device comprising:
- an image receiving medium,
- a lens adapted to image on said image receiving medium a 3D-scene illuminated by rays having wavelengths distributed over a spectrum, said lens having an optical axis and an aperture stop,
- means for dividing an aperture stop plane disc comprised in the surface of the aperture stop and centered on said optical axis into a plurality of mutually exclusive segments comprising a left segment, a right segment and a complementary black and opaque segment, wherein the left segment and the right segment are mutually symmetrical with the center of said disc, and wherein the complementary segment is symmetrical with the center of said disc, said dividing means comprising a filter disposed over the left segment at the aperture stop plane disc and adapted to pass a first predetermined portion of the spectrum (ex.: ref. 132 on FIG. 8—red filter), and a second filter disposed over the right segment of the aperture stop plane disc and adapted to pass a second predetermined portion of the spectrum (ex.: ref. 134 on FIG. 8—blue-green, i.e. cyan filter).

In such an anaglyphic stereoscopic image capture device, rays emanating from the illumination of the objects of the scene and imaging these objects through said lens on the image receiving medium are divided at the aperture stop plane disc into a first group of rays in the first portion of the spectrum (ref. 62a on FIG. 5), a second group of rays in the second portion of the spectrum (ref. 62b on FIG. 5), such that rays of the first and second groups converge on the image receiving medium to form an anaglyphic composite image of the scene, which is formed of a first red image of the scene in the first (red) portion of the spectrum, and a second (cyan) image of the scene in the second portion of the spectrum.

In an article published in January 2009, entitled "Magenta-cyan Anaglyphs", and authored by Robin Lobel, the advantage of using magenta-cyan anaglyph images are emphasized over other types of combination of primary colors, as the red-cyan anaglyphs for instance. Such magenta-cyan anaglyphs send a common primary blue color to both eyes. The ghosting of blue color that may occur due the mixing of blue left and blue right primary images is avoided by blurring horizontally these images by an amount equal to the average parallax. Due the low spatial frequency perception of blue by the human eye, such a blurring does not reduce the sharpness of the colored images as perceived by the viewers.

SUMMARY OF INVENTION

It is an object of the invention to improve the anaglyphic stereoscopic image capture device of the document U.S. Pat. No. 3,712,199 notably by adapting it for two anaglyph colours, notably as the cyan-magenta, having a common portion of their spectra, notably in the blue, and to blur the color component of the images having this common portion, by setting a smaller depth field to this specific component.

For this purpose, the subject of the invention is an anaglyphic stereoscopic image capture device comprising:
- an imaging light sensor,
- a lens adapted to image on said imaging light sensor a 3D-scene illuminated by rays having wavelengths distributed over a spectrum, said lens having an optical axis and an aperture stop,
- an aperture stop disc comprised approximately in the surface of the aperture stop, centered on said optical axis, and divided into a plurality of mutually exclusive filtering segments comprising a first filtering segment and a second filtering segment, wherein the first filtering segment and the second filtering segment are mutually symmetrical with respect to a symmetry axis passing through the center of said aperture stop disc, wherein the first filtering segment is adapted to pass a first predetermined portion of the spectrum and wherein the second filtering segment is adapted to pass a second predetermined portion of the spectrum which is different from the first predetermined portion, wherein:
  - the aperture stop disc comprises also a third filtering segment that is symmetrical with said symmetry axis,
  - the first predetermined portion of the spectrum and the second predetermined portion of the spectrum comprise a common portion of the spectrum,
  - the third filtering segment is adapted to pass a third portion of the spectrum included in said common portion of the spectrum,
  - the third filtering segment is adapted not to pass the part of the first predetermined portion of the spectrum which is out of said common portion and not to pass the part of the second predetermined portion of the spectrum which is out of said common portion.

Preferably, the third filtering segment is adapted to pass only this third portion of the spectrum.

The third portion of surface of the aperture stop disc passing the color component of images corresponding to the third portion of the spectrum is larger than the first portion of surface of the aperture stop disc passing the color component corresponding to the first portion of the spectrum—which corresponds to the first filtering segment, and is larger than the second portion of surface of the aperture stop disc passing the color component corresponding to the second portion of the spectrum—which corresponds to the second filtering segment, because this third portion of surface includes the first, the second and the third filtering segments. Compared to the prior art, this invention provides notably more luminous and brighter images not only due to the third portion of the spectra passing through the first and second filtering segment, but also due to the presence of a third segment passing the third portion of the spectra.

Due to this larger third portion of surface, the aperture assigned to the color component corresponding to the third portion of the spectrum is larger than the aperture assigned to the color component corresponding to the first portion or to the second portion of the spectrum. Therefore, the depth field of the color component corresponding to the third portion of the spectrum is smaller than the depth field of the color component corresponding to the first portion or to the second portion of the spectrum. Consequently, the color component of the captured images corresponding to the third portion of the spectrum is blurred.

In operation, preferably, rays emanating from the illumination of said scene and imaging said scene through said lens on said imaging light sensor are divided at said aperture stop plane disc into a first group of rays in the first portion of the spectrum, a second group of rays in the second portion of the spectrum and a third group of rays in the third portion of the spectrum, and rays of the first, second and third groups converge to form an anaglyphic composite image of said scene on the photosensitive surface of said imaging light sensor.

As the third filtering segment is adapted to pass a third portion of the spectrum included in the common portion of the spectrum, and adapted not to pass the part of the first portion of the spectrum which is out of said common portion and not to pass the part of the second portion of the spectrum which is out of said common portion, and notably when the third filtering segment is adapted to pass only this third portion of the spectrum, the blurred color component of the captured images corresponding to this third portion of the spectrum does not interfere with other color components, which are then advantageously not blurred and kept quite sharp.

Preferably, the third filtering segment fills up fills up approximately the surface of the aperture stop disc except the surface corresponding to the first filtering segment and to the second filtering segment. Captured images are then still more luminous and brighter.

Preferably:
the first predetermined portion of the spectrum is defined such as to give a magenta hue to a polychromatic white light beam passing the first filtering segment,
the second predetermined portion of the spectrum is defined such as to give a cyan hue to the polychromatic white light beam passing the second filtering segment, and
the third predetermined portion of the spectrum is defined such as to give a blue hue to the polychromatic white light beam passing the third filtering segment.

Preferably:
the first filtering segment is defined in order not to transmit significantly wavelengths comprised between 480 nm and 580 nm and in order to transmit significantly wavelengths inferior to 460 nm and wavelengths superior to 600 nm;
the second filtering segment is defined in order not to transmit significantly wavelengths superior to 580 nm and in order to transmit significantly wavelengths inferior to 560 nm;
the third filtering segment (13) is defined in order not to transmit significantly wavelengths superior to 480 nm and in order to transmit significantly wavelengths inferior to 460 nm.

Of course, this third portion of the spectrum still belongs both to the first portion of the spectrum and to the second portion of the spectrum, as a blue spectrum belongs both to a magenta spectrum and to a cyan spectrum.

This preferred definitions of the portions of the spectrum and/or of the filtering segments infers that this is the blue component of the captured images that is blurred. As the spatial definition of the human eye is smaller for the blue colors compared to other colors, notably compared to the green colors, the blurring of the blue component of the captured images is advantageously not considered any more as a drawback.

Preferably, the aperture stop disc is made of the overlay of two plane color filters, each having a hole or a notch the shape of which corresponds to one of the symmetrical first and second filtering segment, the two color filters being shifted in 180° rotation to position the hole or notch of each filter in symmetry one with the other one with respect to an axis parallel to these filters and passing though the common center of these filters, the material of the first filter being chosen such as to transmit wavelengths as the first filtering segment, and the material of the second filter being chosen such as to transmit wavelengths as the second filtering segment.

Preferably, the lens comprises an iris which is centered on the optical axis of the lens and positioned immediately adjacent or in the vicinity of the aperture stop disc.

Preferably, the aperture stop disc is divided into four sectors around its center: a first sector corresponding to the first filtering segment, a second sector corresponding to the second filtering segment which is symmetrical of the first one with respect to said symmetry axis, a third sector corresponding to a first sub-segment of the third filtering segment and a fourth sector corresponding to a second sub-segment of the third filtering segment, the first sub-segment and the second sub-segment being each located on a different side of a line which is perpendicular to said symmetry axis and passes through the center of the aperture stop disc, and making together the third filtering segment.

Preferably, any circle being defined as centered on the center of the aperture stop disc, as covering this aperture stop disc, and being divided in at least four arcs, a first arc covering the first filtering segment, a second arc covering the second filtering segment, a third arc covering the first sub-segment of the third filtering segment, and a fourth arc covering the second sub-segment of the third filtering segment, the geometry of the three filtering segments is defined such the length of each of these arcs increases monotonously in function of the radius of said circle.

BRIEF DESCRIPTION OF DRAWINGS

The invention will be more clearly understood on reading the description which follows, given by way of non-limiting example and with reference to the appended figures in which.

DESCRIPTION OF EMBODIMENTS

In order to allow a viewer to watch an anaglyphic stereoscopic image, this viewer should wear anaglyphic spectacles. Such spectacles have a left color filtering lens passing a first portion of the visible spectrum and a right color filtering lens passing a second portion of the visible spectrum, different from the first portion, such that the image seen by viewer's left eye through the left lens may be different from the image seen by viewer's right eye through the right lens. Each anaglyphic stereoscopic image therefore comprises intrinsically a left-eye image and a right-eye image. The difference between the left-eye image and the right-eye image of an anaglyphic stereoscopic image corresponds to lateral displacements of objects in the stereoscopic image that provoke the binocular perception of 3D by the viewer.

The anaglyphic stereoscopic image capture device according to the invention comprises a camera body having a light chamber comprising itself a pixelated imaging light sensor, notably based on CCD or CMOS technology. This camera body may be of any type as for example a movie camera or a still camera. A lens is mounted to this camera body and so positioned to form an image at its plane of focus which coincides with the light sensitive surface of the imaging light sensor. The light sensitive surface of the imaging light sensor is adapted to be spectrally sensitive to different primary colours distributed throughout the visible spectrum, as, for instance, a red primary colour, a green primary colour, and a blue primary colour.

It is a general characteristic of a lens system that there exists a plane, physically associated with reference to the lens, which possesses characteristics termed the aperture stop plane. This aperture stop limits the size of the axial cone of energy which is accepted from object space and transferred to image space. It is a property of the aperture stop that all light emanating from a point in 3-dimensional object space and accepted by the lens generally fills the aperture stop, that is to say, the resultant image in image space within the camera is made up of approximately even distribution of rays which have travelled equally throughout the entire area of the aperture stop.

The lens comprises an aperture stop disc 1 comprised approximately in the surface of the aperture stop and centered on the optical axis of this lens. As shown on FIG. 1B, the aperture stop disc 1 is divided into a plurality of mutually exclusive filtering segments comprising a first (left) filtering segment 11, a second (right) filtering segment 12, and a third and complementary filtering segment 13. The left filtering segment 11 and the right filtering segment 12 are mutually symmetrical with a symmetry axis passing through the center of the aperture stop disc 1. The orientation of this symmetry axis is supposed to be vertical during the capture of stereoscopic images, in order to have the two intrinsic images of each stereoscopic image corresponding actually to left-eye and right-eye images. The third and complementary filtering segment 13 fills up approximately the remaining surface of the aperture stop disc 1, i.e. fills up the surface of the aperture stop disc 1 except the surface corresponding to the first filtering segment 11 and to the second filtering segment 12. As a variant, the third and complementary filtering segment 13 may correspond to only a portion of the remaining surface of the disc 1. As shown on FIG. 1B, the complementary filtering segment 13 is symmetrical with the symmetry axis as defined above. The first filtering segment 11 is adapted to pass a first predetermined portion of the spectrum. The second filtering segment 12 is adapted to pass a second predetermined portion of the spectrum. According to the invention, the third filtering segment 13 is adapted to pass a third portion of the spectrum included in the common portion of the spectrum comprised both in the first predetermined portion of the spectrum and in the second predetermined portion of the spectrum, and is adapted not to pass the part of the first portion of the spectrum which is out of this common portion and not to pass the part of the second portion of the spectrum which is out of this common portion. Generally, the filtering segments 11, 12 and 13 are positioned contiguous to each other on the aperture stop disc 1. As exemplified below, some of these filtering segments may be composed of several color-filtering layers.

The lens is not otherwise modified except as may be necessary to compensate slightly for the presence of the thickness of the aperture stop disc 1.

As a corollary, it is observed that the addition of this aperture stop disc 1 having different filtering segments 11, 12 and 13 passing different portions of the spectrum results in losses of the light energy being transferred by the lens from object to image space.

The filtering segments of the aperture stop disc 1 are preferably constructed, in a manner known per se, to provide brightness transmission of the corresponding portions of the spectrum that they transmit, so that when the image captured by the anaglyphic stereoscopic image capture device is viewed with similar viewing filters to be describe, approximately equal brightness sensation will be produced in the view's eyes. This will avoid any discomfort which might be caused by the pupils of each eye being required to respond to different brightness levels.

As an example, the lens mounted on the camera is of the double meniscus anastigmat type having two negative meniscus inner doublets and outer positive elements, the last of which has been compounded as a doublet. The aperture stop disc 1 of the lens is then located between the inner meniscus elements. The present invention may be adapted for use with all types of camera objectives.

Figure 3:
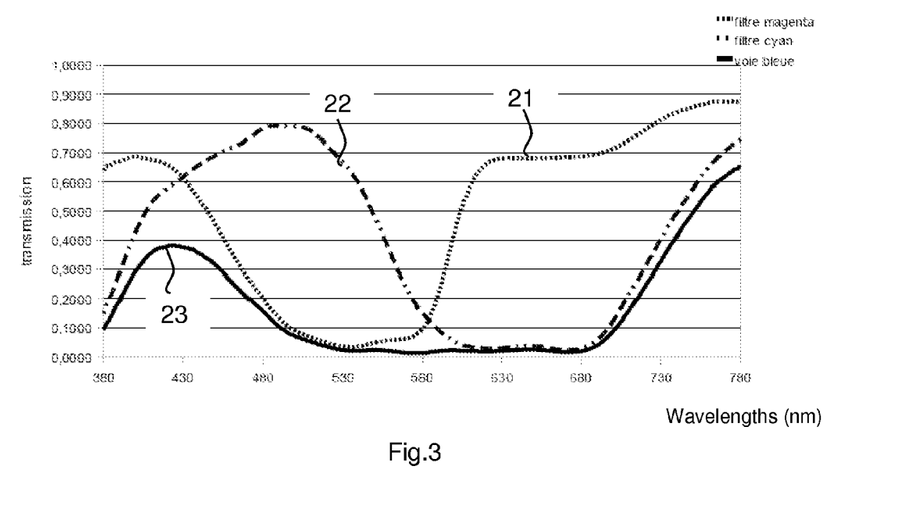
FIG. 3 illustrates an example of spectral transmission for each filtering segments of the aperture stop disc of FIG. 1B and FIG. 2B.

While many possible divisions of the spectrum into a first and a second portion having a third common portion are possible, one particular division is preferred, as exemplified below in reference to FIG. 3 which shows transmission of each filtering segments 11, 12, 13 and the spectral distribution of each portions of the spectrum 21, 22, 23 as a function of wavelength.

Preferably, the first portion of the spectrum 21 is defined such as to give a magenta hue to a polychromatic white light beam passing the first filtering segment 11. This first portion of the spectrum 21 preferably corresponds to wavelengths inferior to 460 nm and to wavelengths superior to 600 nm. As shown on FIG. 3, this first filtering segment 11 is preferably defined in order not to transmit significantly wavelengths comprised between 480 nm and 580 nm and in order to transmit significantly wavelengths inferior to 460 nm and wavelengths superior to 600 nm.

Preferably, the second portion of the spectrum 22 is defined such as to give a cyan hue to a polychromatic white light beam passing the second filtering segment 12. This second portion of the spectrum 22 preferably corresponds to wavelengths inferior to 560 nm. As shown on FIG. 3, this second filtering segment 12 is preferably defined in order not to transmit significantly wavelengths superior to 580 nm and in order to transmit significantly wavelengths inferior to 560 nm.

With such a first and second filtering segments 11, 12 as preferably defined above, the common portion of the spectrum comprised both in the first portion of the spectrum and in the second portion of the spectrum corresponds to wavelengths inferior to 460 nm. As shown on FIG. 3, the third filtering segment 13 of the invention is then defined in order not to transmit significantly wavelengths superior to 480 nm and in order to transmit significantly wavelengths inferior to 460 nm. It means that the third filtering segment 13 is defined in order not to pass the part of the first portion of the spectrum which is out of the common portion, and in order not to pass the part of the second portion of the spectrum which is out of the common portion. The third portion of the spectrum 22 is preferably defined such as to give a blue hue to a polychromatic white light beam passing the third filtering segment 13.

As a variant concerning the division of the spectrum into a first and a second portion having a third common portion, another particular division can be used, in which the first portion of the spectrum is defined, as above, such as to give a magenta hue to a polychromatic white light beam passing the first filtering segment, in which the second portion of the spectrum is defined such as to give a yellow hue to a polychromatic white light beam passing the second filtering segment, and in which the third portion of the spectrum is defined such as to give a red hue to a polychromatic white light beam passing the third filtering segment.

The filtering segments possess a band pass transmission characteristic which is quite high throughout the range over which they are transmissive but reduces to a negligible value outside of this range. Such filtering segments can take any of various forms, dichroic reflectors made by coating transparent substrates being one particularly efficient type. Mispositioning of the filtering segments or of the whole aperture stop disc as by imperfections of lateral placement, axial displacement from the plane of the aperture stop and vertical misalignment or skew are found to be reasonably non-critical.

An embodiment of operation of the anaglyphic stereoscopic image capture device according to the invention will now be described. It is assumed that the lens of the image capture device is set in a manner known per se such that a particular plane of interest in object space of the 3D-scene to capture is imaged on the focal plane of the photosensitive surface of the imaging light sensor, i.e. in the image space comprised in the camera chamber. It is also assumed that there exists a plurality of foreground and background planes in object space which are imaged into background and foreground planes respectively in this image space. It should again be noted that every ray of energy emanating from an object in object space and capable of passing through the lens and therefore through the aperture stop disc represents a single point in the plane of the aperture stop and that all light received from the object completely fills the aperture stop (this assumption neglects directed ray energy, i.e., light sources having a directed output, but this lack of generality is so minor as to be negligible). By positioning the aperture stop disc 1 with its filtering segments 11, 12, 13 at the aperture stop, or close to the aperture stop, this aperture stop disc is therefore illuminated by a first group of rays which pass through the first filtering segment 11, by a second group of rays which pass through the second filtering segment 12, and by a third group of rays which pass through the third filtering segment 13. At each image location in the 3-dimensional image space of the camera chamber, these groups of rays converge into a composite image having balanced color composition derived from the addition together of the three groups of ray bundles. The first and the second bundles however, have a binocular separation or disparity relative to the (horizontal) distance between the symmetrical first and second filtering segments 11, 12 on both sides of the (vertical) symmetry axis. As the third filtering segment 13 is symmetrical with the (vertical) symmetry axis, the third bundle has no binocular separation.

Each composite image in image space is constructed of the converging first, second and third bundles emanating from the first, second and third filtering segments 11, 12, 13 of the aperture stop disc 1. The differing spectral content of these converging first, second and third bundles ads up to form the composite colored images.

Assume the lens is adjusted to bring a particular plane of interest in 3-dimensional object space into focus on the plane of the photosensitive surface of the imaging light sensor within an exposure frame of the image capture device in operation. In general, this requires nothing more than adjusting the distance of the lens or other appropriate geometry from the photosensitive surface in such a manner that those composite images from the plane of interest in object space and formed into images in 3-dimensional image space fall into registry with the photosensitive surface. It is immediately recognized that composite images formed in front of or behind this image plane of interest will not be in exact focus registry with the plane.

Referring now to three objects in a 3D-scene to be image captured in the object space, a first object being in the plane of interest, a second object being in the foreground in front of this plane of interest, and a third object being in the background behind this plane of interest.

First, the first object will appear, through the lens, as a coalesced and sharp first composite image at the light photosensitive surface of the imaging light sensor. It accordingly will expose that surface with the first, the second and the third portion of the spectrum, as if no color filtering action had taken place through the first, second and third filtering segments, except light attenuation.

However, the second foreground object will become, through the lens, a second composite image lying in the background of image space and, accordingly, the ray bundle passing through the first filtering segment 11, the ray bundle passing through the second filtering segment 12, and the ray bundle passing through the third filtering segment 13 will be converging as they intersect the plane of the photosensitive surface of the imaging light sensor. This results in slight lateral displacement and fringing of the exposure of the photosensitive surface in correspondence to the distance of the second composite image away from the plane of the photosensitive surface in image space, i.e. in correspondence to the distance of the second foreground object from the plane of interest in object space.

Similarly, the third background object will become, through the lens, a third composite image lying in the foreground of image space, which is formed by the ray bundle passing through the first filtering segment 11, by the ray bundle passing through the second filtering segment 12, and by the ray bundle passing through the third filtering segment 13. The exposure at the photosensitive surface of the imaging light sensor is then also accompanied by slight lateral displacement of the diverging first, second and third ray bundles emanating from this third composite image. This lateral displacement or fringing of the exposure of the photosensitive surface is also in correspondence to the distance of the third composite image away from the plane of the photosensitive surface in image space, i.e. in correspondence to the distance of the third background object from the plane of interest in object space.

Now assume the viewer of an anaglyphic stereoscopic image of the 3D-scene comprising the three objects above, captured as indicated above by the anaglyphic stereoscopic image capture device of the invention and displayed on a plane of display (as on the screen of a projection display or of a LCD), wears a pair of filtering spectacles, where the left lens of these spectacles is adapted to pass the first portion of the spectrum 21, and the right lens of these spectacles is adapted to pass the second portion of the spectrum 22.

If we consider the first exposure image which was produced from the first object in object space, this first exposure image will give, through each lens of the spectacles, a first left image on the retina of the viewer's left eye and a first right image on the retina of the viewer's left eye, without any lateral displacement between these left and right images. The viewer will then perceive the first object in the plane of display.

Now consider the second exposure image which was produced from the second foreground object in object space, this second exposure image will give, through each lens of the spectacles, a second left (magenta) image on the retina of the viewer's left eye and a second right (cyan) image on the retina of the viewer's left eye, with a slight lateral displacement between these left and right images, inducing the viewer to increase the convergence of his eyes in such a manner as to bring these left and right second images into registry. The viewer will then perceive the second object in front of the plane of display, i.e. before the first object. Both left and right fringes of this second exposure image have a common color component related to the hue of the third portion of the spectrum 23, here a blue hue, contributing to a blue blurring effect.

Likewise, consider the third exposure image which was produced from the third background object in object space, this third exposure image will give, through each lens of the spectacles, a third left (magenta) image on the retina of the viewer's left eye and a third right (cyan) image on the retina of the viewer's left eye, with a slight lateral displacement between these left and right images opposite to the previous lateral displacement, inducing the viewer to decrease the convergence of his eyes in such a manner as to bring these left and right third images into registry. The viewer will then perceive the third object in the background the plane of display, i.e. behind the first object. Again, both left and right fringes have a common color component related to the hue of the third portion of the spectrum 23, here a blue hue, contributing to a blue blurring effect.

As a summary and conclusion of the operation of the image capture device according to an embodiment of the invention, rays emanating from the illumination of a 3D-scene and imaging this scene through the lens on the imaging light sensor are divided at the aperture stop plane disc 1 into a first group of rays in the first portion of the spectrum 21, a second group of rays in the second portion of the spectrum 22 and a third group of rays in the third portion of the spectrum 23. Rays of the first, second and third groups converge to form an anaglyphic composite image of the 3D-scene on the photosensitive surface of the imaging light sensor. This anaglyphic composite image is then registered and stored in a manner known per se. When this captured anaglyphic composite image is viewed by a viewer wearing a pair of filtering spectacles with a left lens adapted to pass the first portion of the spectrum 21, and a right lens adapted to pass the second portion of the spectrum 22, the viewer sees with his left eye a first image of the scene in the first portion of the spectrum 21 and with his right eye a second image of said scene in the second portion of the spectrum 22, therefore providing this viewer a binocular perception of the captured scene.

As the third portion of the spectrum 23 is common to the first portion of the spectrum 21 and to the second portion of the spectrum 22, the third portion of surface of the aperture stop disc 1 passing the color component of images corresponding to the third portion of the spectrum 23 is larger than the first portion of surface of the aperture stop disc—i.e. the first filtering segment 11—passing the color component corresponding to the first portion of the spectrum 21, and is larger than the second portion of surface of the aperture stop disc—i.e. the second filtering segment 12—passing the color component corresponding to the second portion of the spectrum 22, because this third portion of surface includes the first 11, the second 12 and the third 13 filtering segments. Therefore, the aperture stop disc 1 provides notably more luminous and brighter images not only due to the third portion of the spectra passing through the first and second filtering segment, but also due to the presence of a third segment passing the third portion of the spectra.

Due to this larger third portion of surface, the aperture assigned to the color component corresponding to the third portion of the spectrum is larger than the aperture assigned to the color component corresponding to the first portion and to the second portion of the spectrum. Therefore, the depth field of the color component corresponding to the third portion of the spectrum is smaller than the depth field of the color component corresponding to the first portion and to the second portion of the spectrum. Consequently, the color component of the captured images corresponding to the third portion of the spectrum is blurred compared to the sharpness of the color component of the captured images corresponding to the first and to the second portion of the spectrum.

The blurring comes also from the fringes of the composite images, as previously described.

The preferred definitions of the portions of the spectrum 21, 22, 23 and/or of the filtering segments 11, 12, 13 as described above with an anaglyph system based on the preferred magenta-cyan pair infers that this is the blue component of the captured images that is blurred. As the spatial definition of the human eye is smaller for the blue colors compared to other colors, notably compared to the green colors, the blurring of the blue component of the captured images is advantageously not considered any more as a drawback.

Other pairs of anaglyph can be used to implement the invention, as notably the magenta-yellow pair that will produce red blurring instead of blue blurring.

Figure 1A:
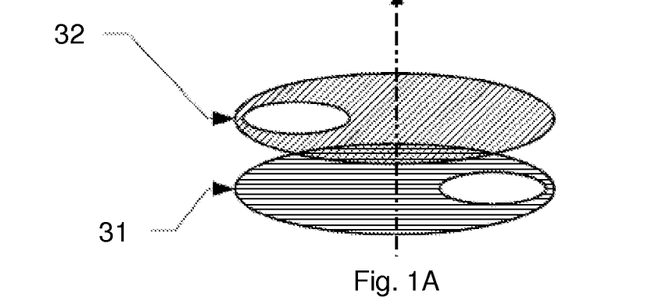
FIG. 1A illustrates how the aperture stop disc of FIG. 1B can be made from the overlay of two plane color filters.
Figure 1B:
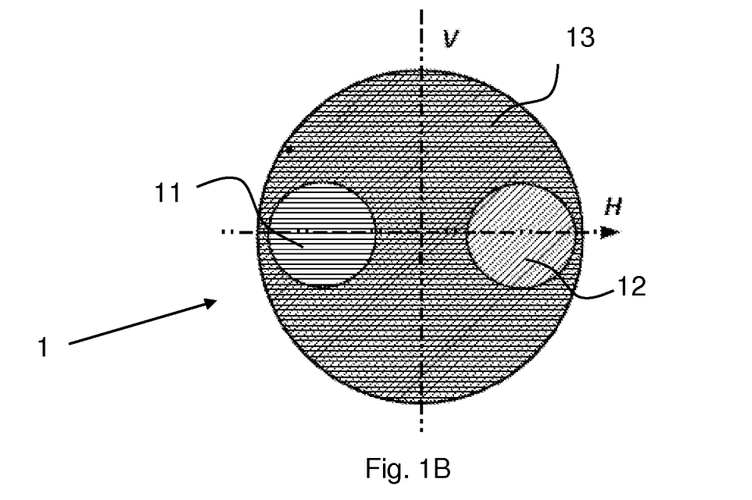
FIG. 1B illustrates a first embodiment of an aperture stop disc for an anaglyphic stereoscopic image capture device of the invention.

Advantageously and in reference to FIG. 1A, the aperture stop disc 1 of the invention is made of the overlay of two plane color filters 31, 32 with a hole the shape of which corresponds to any of the symmetrical first and second filtering segment 11, 12, the two color filters 31, 32 being shifted in 180° rotation to position the hole of each filter 31, 32 in symmetry one with the other through an axis parallel to these filters and passing though the common center of these filters, the material of the first filter 31 being chosen such as to transmit (magenta) wavelengths as the first filtering segment 11, and the material of the second filter 32 being chosen such as to transmit (cyan) wavelengths as the second filtering segment 12. Advantageously, the region of overlap of the two filters 31, 32 corresponds then to the third filtering segment 13 and transmits in the third portion of the spectrum (blue).

As a variant of the image capture device of the invention, the lens has an iris having a circular periphery the radius of which can set between a "full closed" position and a "full open" position, which is centered on the optical axis of the lens and positioned immediately adjacent or in the vicinity of the aperture stop disc. By varying the radius of this iris, the corresponding radius of a circular section of the aperture stop disc 1 through which light is admitted to pass the filtering segments and to pass the lens can be controlled, therefore allowing to control the amount of light impinging on the photosensitive surface of the imaging light sensor, and allowing to control also the overall depth of field for the capture of images.

Figure 2A:
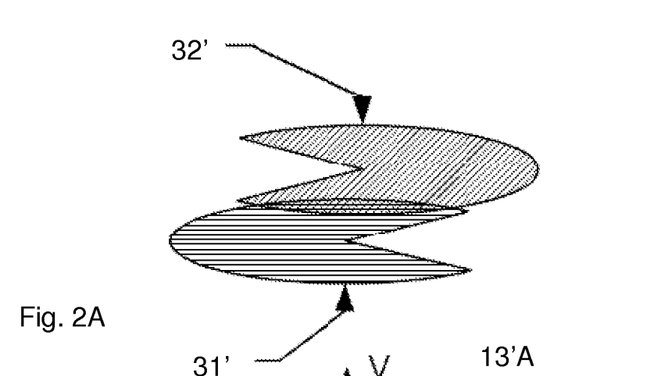
FIG. 2A illustrates how the aperture stop disc of FIG. 2B can be made from the overlay of two other plane color filters.
Figure 2B:
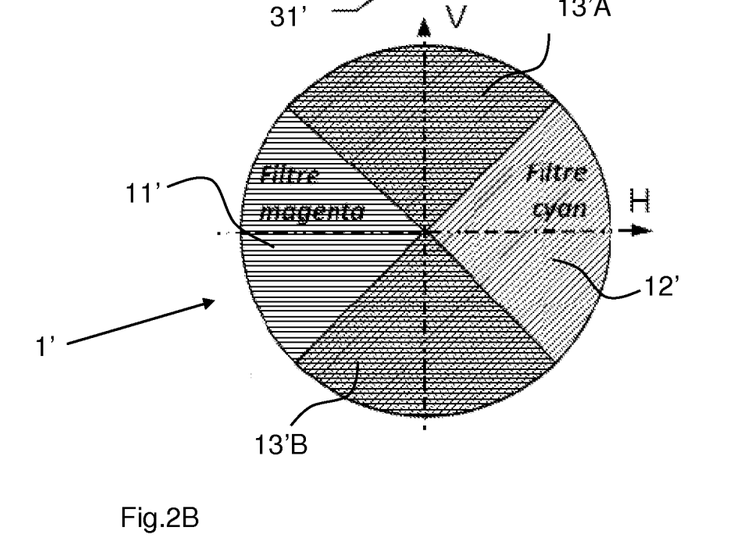
FIG. 2B illustrates a second embodiment of an aperture stop disc for an anaglyphic stereoscopic image capture device of the invention.

A variant concerning the shape of the filtering segments of another embodiment of an aperture stop disc 1' is now described in reference with FIG. 2B. The disc 1' is divided into four equal sectors around its center: a first sector corresponding to a first filtering segment 11', a second sector corresponding to a second filtering segment 12' which is symmetrical of the first one with respect to a vertical axis V passing through the center of the disc, a third sector corresponding to a first sub-segment 13'A of the third filtering segment and a fourth sector corresponding to a second sub-segment 13'B of the third filtering segment, the first sub-segment 13'A and the second sub-segment 13'B being each located on a different side of a horizontal line H passing through the center of the disc and making together the third filtering segment.

The advantage of this variant of the aperture stop disc 1' when the lens comprises an iris is that, whatever is the set radius of this iris (except if radius equals zero), some light is passing through each of the filtering segments of the aperture stop disc 1'. Still more advantageous, the higher is this set radius, the higher is the amount of light passing through each of these filtering segments and through the lens. Such advantage cannot be obtained with the definition of the aperture stop disc 1 according to FIG. 1B.

If a circle of radius R is defined as being centered on the center of the aperture stop disc 1', as covering this aperture stop disc 1, and as being divided in at least four arcs (or portions of circle), a first arc A11'(R) covering the first filtering segment 11', a second arc A12'(R) covering the second filtering segment 12', a third arc A13'A(R) covering a first sub-segment of the third filtering segment 13'A, and a fourth arc A13'B(R) covering a second sub-segment of the third filtering segment 13'B, then, preferably, the geometry of the three filtering segments 11', 12' and 13'A with 13'B is preferably defined such the length of each of these arcs L[A11'(R)]=L[A12'(R)], L[A13'A(R)]=L[A13'B(R)] increases monotonously in function of the radius R of said circle. Such a condition allows advantageously a better control of the lighting conditions for the capture of images. The embodiment illustrated on FIG. 2B meets actually this condition as the perimeter (or length) $2\pi R$ of any circle of radius R is divided in four arcs:

a first arc A11'(R) covering the first filtering segment 11' and a second arc A12'(R) covering the second filtering segment 12' having the same length $2\pi kR$, with k<1, and a first sub-segment of the third filtering segment 13'A and a fourth arc A13'B(R) covering a second sub-segment of the third filtering segment 13'B having the same length $2\pi(1-k)R$, where k is constant whatever is the value of R because the lines separated each filtering segment or sub-segment from its neighbor is a straight line.

Other variants where these separations are not straight lines, and/or where opaque sectors are added between these segments or sub-segments are within the scope of this invention.

Advantageously and in reference to FIG. 2A, the aperture stop disc 1' of the invention is made of the overlay of two plane color filters 31', 32' with a notch the shape of which corresponds to any of the symmetrical first and second filtering segment 11', 12', the two color filters 31', 32' being shifted in 180° rotation to position the notch of each filter 31', 32' in symmetry one with the other through an axis parallel to these filters and passing though the common center of these filters, the material of the first filter 31' being chosen such as to transmit (magenta) wavelengths as the first filtering segment 11', and the material of the second filter 32' being chosen such as to transmit (cyan) wavelengths as the second filtering segment 12'. Advantageously, the region of overlap of the two filters 31', 32' corresponds then to the first sub-segment 13'A of the third filtering segment and to the second sub-segment 13'B of the third filtering segment, and transmits in the third portion of the spectrum (blue).

While the present invention is described with respect to particular examples and preferred embodiments, it is understood that the present invention is not limited to these examples and embodiments. The present invention as claimed therefore includes variations from the particular examples and preferred embodiments described herein, as will be apparent to one of skill in the art. While some of the specific embodiments may be described and claimed separately, it is understood that the various features of embodiments described and claimed herein may be used in combination.

The invention claimed is:

1. Anaglyphic stereoscopic image capture device comprising:
   an imaging light sensor,
   a lens adapted to image on said imaging light sensor a 3D-scene illuminated by rays having wavelengths distributed over a spectrum, said lens having an optical axis and an aperture stop,
   an aperture stop disc comprised in a surface of the aperture stop, centered on said optical axis, and divided into a plurality of mutually exclusive filtering segments comprising a first filtering segment, a second filtering segment, and a third filtering segment, wherein the first filtering segment and the second filtering segment are mutually symmetrical with respect to a symmetry axis passing through the center of said aperture stop disc, wherein the first filtering segment is adapted to pass a first portion of the spectrum, wherein the second filtering segment is adapted to pass a second portion of the spectrum which is different from the first portion,
   wherein the first portion of the spectrum and the second portion of the spectrum comprise a common portion of the spectrum, wherein the third filtering segment is symmetrical with said symmetry axis and is adapted to pass a third portion of the spectrum included in said common portion of the spectrum, and
   wherein the third filtering segment is adapted not to pass part of the first portion of the spectrum which is out of said common portion and not to pass part of the second portion of the spectrum which is out of said common portion.

2. Anaglyphic stereoscopic image capture device according to claim 1,
   wherein rays emanating from illumination of said scene and imaging said scene through said lens on said imaging light sensor are divided at said aperture stop disc into a first group of rays in the first portion of the spectrum, a second group of rays in the second portion of the spectrum and a third group of rays in the third portion of the spectrum, and
   wherein rays of the first, second and third groups converge to form an anaglyphic composite image of said scene on a photosensitive surface of said imaging light sensor.

3. Anaglyphic stereoscopic image capture device according to claim 1, wherein the third filtering segment fills up the surface of the aperture stop disc except the surface corresponding to the first filtering segment and to the second filtering segment.

4. Anaglyphic stereoscopic image capture device according to claim 1, wherein:
   the first portion of the spectrum is defined such as to give a magenta hue to a polychromatic white light beam passing the first filtering segment,
   the second portion of the spectrum is defined such as to give a cyan hue to the polychromatic white light beam passing the second filtering segment, and
   the third portion of the spectrum is defined such as to give a blue hue to the polychromatic white light beam passing the third filtering segment.

5. Anaglyphic stereoscopic image capture device according to claim 1, wherein:

the first filtering segment is defined in order not to transmit significantly wavelengths comprised between 480 nm and 580 nm and in order to transmit significantly wavelengths inferior to 460 nm and wavelengths superior to 600 nm;

the second filtering segment is defined in order not to transmit significantly wavelengths superior to 580 nm and in order to transmit significantly wavelengths inferior to 560 nm; and the third filtering segment is defined in order not to transmit significantly wavelengths superior to 480 nm and in order to transmit significantly wavelengths inferior to 460 nm.

6. Anaglyphic stereoscopic image capture device according to claim 1, wherein the aperture stop disc is made of an overlay of two plane color filters, each having a hole or a notch a shape of which corresponds to one of the symmetrical first and second filtering segment, the two color filters being shifted in 180° rotation to position the hole or notch of each filter in symmetry one with the other one with respect to an axis parallel to these filters and passing through a common center of these filters, a material of the first filter being chosen such as to transmit wavelengths as the first filtering segment, and the material of the second filter being chosen such as to transmit wavelengths as the second filtering segment.

7. Anaglyphic stereoscopic image capture device according to claim 1, wherein the lens comprises an iris which is centered on the optical axis of the lens and positioned immediately adjacent or in a vicinity of the aperture stop disc.

8. Anaglyphic stereoscopic image capture device according to claim 7, wherein the aperture stop disc is divided into four sectors around its center : a first sector corresponding to the first filtering segment, a second sector corresponding to the second filtering segment which is symmetrical of the first one with respect to said symmetry axis, a third sector corresponding to a first sub-segment of the third filtering segment and a fourth sector corresponding to a second sub-segment of the third filtering segment, the first sub-segment and the second sub-segment being each located on a different side of a line which is perpendicular to said symmetry axis and passes through the center of the disc, and making together the third filtering segment.

9. Anaglyphic stereoscopic image capture device according to claim 8, wherein, any circle being defined as centered on the center of the aperture stop disc, as covering this aperture stop disc, and being divided in at least four arcs, a first arc covering the first filtering segment, a second arc covering the second filtering segment, a third arc covering the first sub-segment of the third filtering segment, and a fourth arc covering the second sub-segment of the third filtering segment, geometry of the three filtering segments is defined such that a length of each of these arcs increases monotonously in function of a radius of said circle.

10. A method of capturing an anaglyphic stereoscopic image, the method comprising:

imaging, using a lens, a 3D-scene on an imaging light sensor, the 3D-scene being illuminated by rays having wavelengths distributed over a spectrum, said lens having an optical axis and an aperture stop disc, the aperture stop disc comprising a surface centered on said optical axis and divided into a plurality of mutually exclusive filtering segments comprising a first filtering segment, a second filtering segment, and a third filtering segment, the first filtering segment and the second filtering segment being mutually symmetrical with respect to a symmetry axis passing through a center of said aperture stop disc;

passing, using the first filtering segment, a first portion of the spectrum;

passing, using the second filtering segment, a second portion of the spectrum which is different from the first portion, the first portion of the spectrum and the second portion of the spectrum comprising a common portion of the spectrum, the third filtering segment being symmetrical with said symmetry axis;

passing, using the third filtering segment, a third portion of the spectrum included in said common portion of the spectrum; and preventing, using the third filtering segment, part of the first portion of the spectrum, which is out of said common portion, from passing; and preventing, using the third filtering segment, part of the second portion of the spectrum, which is out of said common portion, from passing.

11. The method according to claim 10, wherein rays emanating from illumination of said scene and imaging said scene through said lens on said imaging light sensor are divided at said aperture stop disc into a first group of rays in the first portion of the spectrum, a second group of rays in the second portion of the spectrum and a third group of rays in the third portion of the spectrum, and wherein rays of the first, second and third groups converge to form an anaglyphic composite image of said scene on a photosensitive surface of said imaging light sensor.

12. The method according to claim 10, wherein the third filtering segment fills up the surface of the aperture stop disc except the surface corresponding to the first filtering segment and to the second filtering segment.

13. The method according to claim 10, wherein:

the first portion of the spectrum is defined such as to give a magenta hue to a polychromatic white light beam passing the first filtering segment, the second portion of the spectrum is defined such as to give a cyan hue to the polychromatic white light beam passing the second filtering segment, and the third portion of the spectrum is defined such as to give a blue hue to the polychromatic white light beam passing the third filtering segment.

14. The method according to claim 10, further comprising preventing, using the first filtering segment, significant transmission of wavelengths comprising between 480 nm and 580 nm in order to transmit significantly wavelengths inferior to 460 nm and wavelengths superior to 600 nm;

preventing, using the second filtering segment, significant transmission of wavelengths superior to 580 nm in order to transmit significantly wavelengths inferior to 560 nm; and preventing, using the third filtering segment, significant transmission of wavelengths superior to 480 nm in order to transmit significantly wavelengths inferior to 460 nm.

15. The method according to claim 10, wherein the aperture stop disc is made of an overlay of two plane color filters, each having a hole or a notch a shape of which corresponds to one of the symmetrical first and second filtering segment, the two color filters being shifted in 180° rotation to position the hole or notch of each filter in symmetry one with the other one with respect to an axis parallel to these filters and passing through a common center of these filters, a material of the first filter being chosen such as to transmit wavelengths as the first filtering segment, and the material of the second filter being chosen such as to transmit wavelengths as the second filtering segment.

16. The method according to claim 10, wherein the lens comprises an iris which is centered on the optical axis of the lens and positioned immediately adjacent or in a vicinity of the aperture stop disc.

17. The method according to claim 16, wherein the aperture stop disc is divided into four sectors around its center: a first sector corresponding to the first filtering segment, a second sector corresponding to the second filtering segment which is symmetrical of the first one with respect to said symmetry axis, a third sector corresponding to a first sub-segment of the third filtering segment and a fourth sector corresponding to a second sub-segment of the third filtering segment, the first sub-segment and the second sub-segment being each located on a different side of a line which is perpendicular to said symmetry axis and passes through the center of the disc, and making together the third filtering segment.

18. The method according to claim 17, wherein, any circle being defined as centered on the center of the aperture stop disc, as covering this aperture stop disc, and being divided in at least four arcs, a first arc covering the first filtering segment, a second arc covering the second filtering segment, a third arc covering the first sub-segment of the third filtering segment, and a fourth arc covering the second sub-segment of the third filtering segment, a geometry of the three filtering segments is defined such that a length of each of these arcs increases monotonously in function of a radius of said circle.

\* \* \* \* \*